March 17, 1936.　　　　C. H. RUMPEL　　　　2,033,956
ELECTRICAL TRANSMISSION CIRCUIT
Filed March 20, 1935
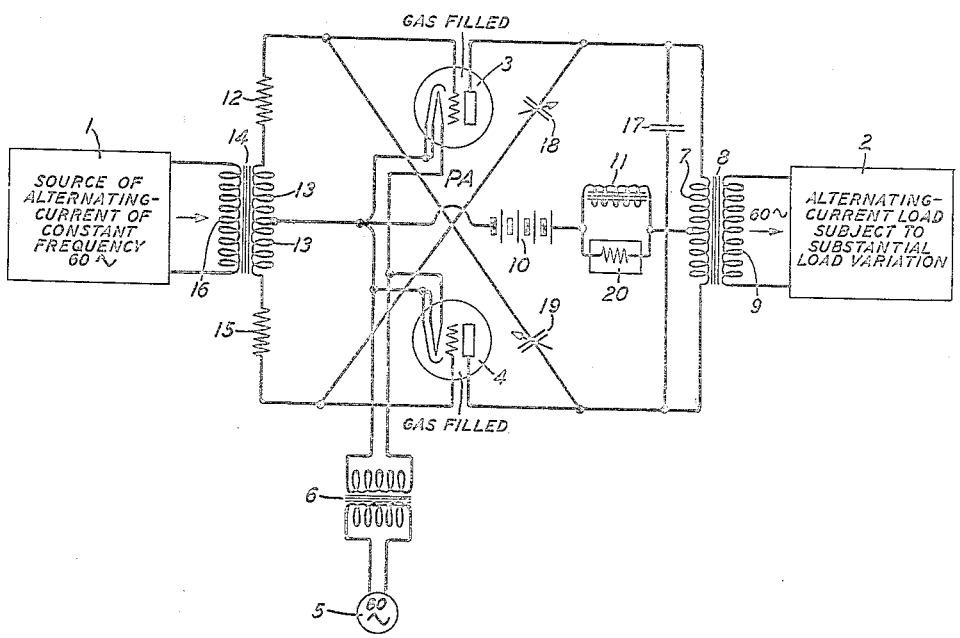
INVENTOR
C. H. RUMPEL
BY
  *H. A. Burgess*
ATTORNEY Patented Mar. 17, 1936

2,033,956

UNITED STATES PATENT OFFICE 2,033,956

ELECTRICAL TRANSMISSION CIRCUIT

Carl H. Rumpel, New York, N. Y., assignor to Bell Telephone Laboratories, Incorporated, New York, N. Y., a corporation of New York Application March 20, 1935, Serial No. 11,924

7 Claims. (Cl. 175—363)

This invention relates to electrical transmission and particularly electrical transmission circuits employing gas-filled electric discharge tubes.

Heretofore, in apparatus employed for transmitting electrical energy between different parts of a transmission system, for example, between an alternating current supply circuit and a load circuit, it has been found advantageous because of the relatively large amount of power which may be handled at ordinary operating voltages to make use of grid-controlled, gas-filled or vapor electric discharge tubes. In one circuit of this type in the prior art, two three-electrode gas-filled tubes are employed, the grids of the tubes being connected to an input transformer in such manner as to become alternately positive and negative in response to an impressed alternating current exciting voltage, and the two plate circuits being connected in push-pull relation through the primary winding of an output transformer. A capacitor connected between the two plates is used for commutating the current between the two tubes so that they become alternately conductive and non-conductive, and an inductance or choke coil is connected in series with the direct current source of supply voltage in the common branch of the plate circuits of the two tubes for the purpose of keeping the alternating current component out of the direct current supply circuit. In an alternative circuit of this type the cathode-anode circuits of the two gas-filled tubes are connected in series with the source of direct current supply through a plurality of choke coils.

It has been found that when circuits as above described are used with a load circuit having substantial load variations the choke coil or coils and the commutating capacitor tend to oscillate to higher and higher voltages under light load conditions, thus raising the output voltage excessively and interfering with commutation so that the circuit will generally fail to commutate or "lock up". Also, if it is desired, as is often the case, that the output voltage of such a circuit remain substantially constant or have a predetermined regulation characteristic, this would require that the power factor of the load be changed each time more load is added or subtracted which is generally impracticable if the load is variable and subject to sudden change.

It is an object of the present invention to increase the reliability of operation of circuits of the above-described type.

Another object is to minimize the effects of transient voltages set up in circuits of the above-described type when they are subjected to certain load conditions.

Another object is to obtain a predetermined voltage regulation characteristic with circuits of the above-described type over a wide range of load conditions for constant power factor loads.

These objects are attained in accordance with the invention mainly by the use of a suitable resistive element in shunt with the inductance or choke coils in the direct current plate supply circuits for the gas-filled tubes.

A more complete understanding of the invention with its various objects and features will be had from the following detailed description thereof when read in connection with the accompanying drawing, the single figure of which shows a power amplifier circuit embodying the invention.

As indicated in the drawing, the power amplifier PA is connected between a source 1 of alternating current waves and an alternating current load circuit 2 having substantial load variations. The source 1 is preferably one which will supply constant frequency alternating current waves of steep wave front, such as would be obtained, for example, from the output of a relaxation oscillator circuit of the well-known Abraham and Block multivibrator type controlled by a constant frequency current produced by a circuit including a vibratory mechanical control element, such as a tuning fork or piezoelectric crystal. The load circuit 2 may be, for example, an electric clock system comprising a plurality of electric clocks driven by 60-cycle synchronous motors, the number of which clocks is variable, in which case the alternating current waves supplied by the source 1 and amplified by the power amplifier PA would have a constant frequency of 60 cycles per second.

The power amplifier PA comprises two electric discharge tubes 3 and 4 each provided with a cathode, an anode and a control electrode or grid, which tubes are of the grid-controlled vapor electric type in which the starting of current in the tube may be controlled by the potential on its grid but in which the current in the tube can be interrupted only by momentarily removing or reversing the potential of the anode circuit. The cathodes of the tubes 3 and 4 are preferably, as shown, of the heater type arranged to be heated in parallel from a source of alternating current 5 at proper voltage, such as commercial 60-cycle, 115-volt lighting mains, through the usual step-down transformer 6, but alternatively may be of the ordinary type heated by a direct current source. The anodes of the two tubes 3 and 4 are connected through the primary winding 7 of the output transformer 8, the secondary winding 9 of which is connected to the load circuit 2 as shown. The anodes of the tubes 3 and 4 are energized from a common direct current source 10, the positive terminal of which is connected through the inductance or choke coil 11 to an electrical midpoint of the primary winding 7, and the negative terminal of the direct current source 10 is connected directly to a terminal common to the cathode circuits of tubes 3 and 4.

In order periodically to render the tubes 3 and 4 alternately conductive and non-conductive, to transmit alternating current to the load circuit 2, the grid of the tube 3 is connected through the series current limiting resistor 12 and the upper half of the secondary winding 13 of the grid transformer 14 to a common point in the cathode circuits of the two tubes, the grid of the tube 4 is connected through the series current limiting resistor 15 and the lower half of the secondary winding 13 to said common point in the cathode circuits of the tubes, and the primary winding 16 of the grid transformer 15 is connected to the source 1 of alternating current waves of the constant frequency (60 cycles) which it is desired to supply to the load circuit 2. In case the source 1 of constant frequency is not of the type which produces a wave of steep wave front, the grid transformer 14 is preferably of the self-saturating type in order to convert the alternating potential supplied by the source 1 into one of peaked wave form which is particularly suitable for exciting the grids of tubes of the vapor type.

A suitable capacitor 17 is connected between the anodes of the tubes 3 and 4 in shunt with the primary winding 7 of the output transformer 8, for commutating the current between the two tubes. Also, the anode of each of the tubes 3 and 4 is connected directly to the grid of the other tube through one of the capacitors 18 and 19, respectively, and the resistive device 20 is connected in shunt with the inductance or choke coil 11 in the common branch of the anode circuits of the two tubes, for purposes which will be brought out below.

The general principles of operation of the translating circuit of the general type described above for transmitting alternating current energy of constant frequency to the load circuit 2 when excited by the alternating current voltage of that frequency supplied by the source 1, are well known to persons skilled in the art and need only be briefly described here.

As is well known, with a positive potential placed on the plate of a vapor electric discharge tube of the general type described, the plate to cathode path of the tube is non-conducing when the grid of the tube is negative but it becomes conducting when the grid is made positive with respect to the cathode. Once the tube becomes conducting it remains so, independent of any changes in the grid voltage and the conduction does not cease until the positive plate voltage is removed or reversed in polarity. When the 60-cycle exciting voltage impressed on the grid circuits of the tubes 3 and 4 through the grid transformer 14 makes the grid of the tube 3 positive, conduction of current occurs through the tube 3 over the path extending from the positive terminal of the direct current source 10 through the choke coil 11 and resistive device 20 in parallel, the upper half of the primary winding 7 of output transformer 8, the anode to cathode of tube 3, to the negative terminal of the direct current source 10 causing to be induced in the secondary winding 9 of the output transformer 8 connected to the load circuit 2, one-half cycle of alternating current of the frequency supplied by the source 1. The grid of the tube 4 being negative during this interval no conduction takes place through that tube. During this interval, the capacitor 17 becomes charged to the potential across the total primary winding 7 of the output transformer 8.

On the next half-cycle of the 60-cycle exciting voltage applied to the grid circuits of the tubes 3 and 4, the grid of tube 4 becomes positive and its plate circuit becomes conducting. While the grid of tube 3 is now negative the conduction in tube 3 does not stop, since, as mentioned above, once the tube becomes conducting, the conduction cannot be stopped by changes in the grid circuit. However, when the tube 4 becomes conductive, the capacitor 18, which is charged during the previous half-cycle, is effective to commutate the current between the tubes, that is, to shift the conducting path from tube 3 to tube 4 in the manner which will be described below. During this second half-cycle, the tube 4 now being conductive the current will flow through the tube 4 over a path extending from the positive terminal of the direct current source 10 through the inductance 11 and resistive device 20 in parallel, the lower half of the primary winding 7 of output transformer 8, the plate to cathode of tube 4 to the negative terminal of direct current source 10, causing to be induced in the secondary winding 9 of the output transformer 8 a half-cycle of alternating current of opposite polarity which will be supplied to the load circuit 2.

The method of commutation may be briefly explained as follows: Considering the first part of the cycle described above when tube 3 is conducting and tube 4 is non-conducting, due to the primary winding 7 of transformer 8 acting as a 2:1 step-up auto-transformer, the capacitor 17 is momentarily charged up to practically twice the full direct current voltage of the direct current source 10. Neglecting the small plate to cathode drop in tube 3, a positive potential of this double voltage is, therefore, applied to the plate of tube 4. Now when tube 4 becomes conducting on the next half-cycle of the exciting voltage, the plate to cathode circuit of tube 4 acts as a short on the capacitor 17, and that condenser discharges momentarily reversing the polarity of the voltage on the plate of tube 3 and stopping conduction in tube 3, sufficiently long for its grid, which must now be negative if the grid of tube 4 is positive, to regain control, that is, prevent the reestablishment of the arc. During the next half-cycle of the grid exciting voltage, this process is reversed and in this way the conduction is shifted from one tube to the other, resulting in a continuous flow of alternating current in the secondary winding 9 of the output transformer 8.

The purpose of the condensers 18 and 19 connected from the plate of each tube 3 or 4 to the grid of the other tube is to increase the reliability of operation by permitting the power unit to continue operating without a commutation failure when the grid excitation voltage from the source 1 is appreciably reduced or momentarily removed. Such a condition may occur in service when the power supply to the circuit which generates the grid excitation voltage is momentarily reduced to zero either by a short-circuit or changing from one primary power source to another.

The action of the capacitors 19 and 20 is to make the power unit slightly self-oscillating such that it can continue to operate without grid excitation for a few cycles. If capacitors 18 and 19 are made sufficiently large the power unit may be made entirely self-exciting and continue to operate indefinitely without external grid excitation from the source 1. However, it is preferred to make the values of the capacitors 18 and 19 small, so that only a slight amount of this self-exciting effect is retained. This permits the unit to "over-ride", without commutation failure, transient voltage conditions in the grid exciting current.

A secondary effect of the addition of the condensers 18 and 19 is to permit operation of the unit at somewhat higher ambient temperatures than otherwise could be attained. This is on account of the decrease in de-ionization time caused by the grid of the non-conducting tube being driven more negative than it would be without the capacitors 18 or 19. This action is as follows:

Suppose the tube 3 to be near the end of this conducting cycle. At this instant, the potential across capacitor 19 will be approximately equal to the potential across the tube 4 (say, about 210 volts). When tube 4 becomes conducting the potential between its plate and cathode will be reduced to a very low value (say, about 15 volts) causing capacitor 19 to discharge through resistance 12 in such a direction as to drive the grid of tube 3 momentarily more negative (about 210 volts) than it would be without the action of capacitor 19. This high negative potential on tube 3 has the effect of decreasing the de-ionizing time of tube 3. This permits the power unit to be operated at either a higher frequency or at higher ambient temperatures because under either of these conditions the de-ionizing time becomes a limiting factor.

During the same part of the cycle described above, the polarity of condenser 18 which is the reverse of that of condenser 19, drives the grid of tube 4 more positive. This action, normally, however, appears to have little or no effect on the tube operation since it comes at an instant after the tube has been ignited. In the case of transient voltages due to a sudden change of load, however, there is an appreciable effect. This is due to the capacitor passing the transient voltage as a positive charge to the grid of the wrong tube at the wrong instant causing an out-of-phase ignition and hence commutation failure. This action limits the size of capacitors 18 and 19. The size of capacitors 18 and 19, therefore, is preferably made such as will be a compromise between the deteriorating action of the sudden load change transients and the helpful stabilizing action for grid excitation voltage transients.

The resistive device 20 in shunt with the coil 11 is provided for two main purposes (1) to improve the voltage regulation with changes in constant power factor loads, and (2) to reduce the effect of transient voltages which arise with sudden load changes.

In the conventional translating circuit, that is, without the resistive device 20 in shunt with the coil 11, the output voltage drops rapidly as the load is increased. At no load the output voltage may rise to over ten times its normal value with the result that one of the tubes 3 or 4 usually fails to commutate and the circuit "locks up". The rise in voltage is due to oscillations arising between the commutating capacitor 17 and the choke coil or inductance 11. There are two ways of minimizing this effect without the use of the resistive device 20. One way is to operate the circuit only at full load. This, of course, is not practicable when the load with which the circuit is to be used is subjected to substantial variations. The second method is to increase the resonant frequency of the circuit comprising choke coil 11 and the commutating capacitor 17, such that it is never equal or nearly equal to the grid excitation or operating frequency. This method results in a poor wave shape, and, fluctuating output voltage, especially at light loads, and only partial improvement in voltage regulation with constant power factor loads. To procure a flat voltage regulation characteristic or a predetermined voltage regulation characteristic, as is usually desirable, it may be necessary to change the power factor of the load each time more load is added. While such a method can be used, many practical difficulties are encountered especially if the load is variable and liable to sudden changes.

The placing of the resistive device 20 across the inductance 11 damps out any oscillations arising between the inductance 11 and the capacitor 17. The damping, however, is accomplished without causing the capacitor 17 to discharge as would be the case if the resistive device 20 were placed across the capacitor 17. Any resistance placed across the capacitor 17 is just the same as placing an artificial load on the translating circuit and results in only partial improvement of the voltage regulation. The placing of a resistance across the inductance 11 has a small effect at full load and therefore decreases the full load efficiency only a few per cent. At no load, the voltage across the inductance 11 rises and the power absorbed by the resistive device 20 increases as the square of the voltage, and hence the effect of this device on the circuit is increased. By proper design and the selection of the value of the resistive device 20, the translating circuit may be made to have a flat voltage-load regulation curve with a constant power factor load. It is found that the voltage regulation obtained with such a circuit using loads of various power factors (not highly inductive, however) while not zero is nevertheless within 10 per cent over a comparatively large range of power factors.

Preferably, the resistance value of the resistive device 20 is made as high as possible but still sufficiently low to dampen the above-mentioned oscillations between the inductance 11 and the capacitor 17. Making the value of the resistive device 20 too low will effectively remove the inductance 11 from the circuit and cause the current through the conducting tube to increase rapidly to a value so high that commutation cannot take place. A resistance of small value, in the order of 70 ohms, has been found to give satisfactory results. The optimum value of resistance for the device 20, of course, depends upon the particular tubes used and the circuit constants, and can be readily determined experimentally for any circuit. The action of the resistive device 20 as regards voltage regulation can be improved by using therefor a non-linear resistance having a negative resistance-voltage coefficient as, for example, carbon filament lamps or a block of material comprising silicon carbide crystals and an insulatin binder (kaolin), such as is disclosed in a patent to K. B. McEachron, No. 1,822,742 issued September 8, 1931, which has such a negative resistance characteristic. As the voltage across the inductance 11 increases with decreasing load, such a non-linear resistance will absorb power more rapidly than as the square of the voltage. Thus the voltage regulation characteristic may be improved for loads of various power factors.

The action of the resistive device 20 in reducing the transient voltages arising due to sudden changes in load is also due to its damping effect on the inductance 11 and capacitor 17. When the load is suddenly removed wholly or partially, the energy stored in the circuit causes a sudden transient voltage which, if not damped by some means, sets up oscillations or rises excessively high. This upsets the charge on the commutating capacitor 17 and the circuit "locks up". The effect of the resistive device 20 is to minimize transient voltage effects due to sudden changes in load.

In order to make the circuit described above efficient as an amplifier, to minimize distortion and prevent its disabling under some load conditions, it is desirable also that the output transformer be designed so that (1) the inductance of the primary winding 7 is high compared to that of the coil 11, (2) the degree of saturation in the core is kept low, and (3) the transformer is sufficiently large to withstand the heating due to harmonic currents present.

The inductance of the primary winding 7 of the transformer 8 must be high compared to that of the coil 11 because the primary 7 is in effect in parallel with the coil 11. If, therefore, the primary inductance of the transformer 7 is not large compared with that of the coil 11, the load on transformer 8 will in effect decrease the value of the reactor 11 to a point where the power unit can no longer operate.

If the core of the output transformer 8 is allowed to become saturated the effect of the transients in the amplifier circuit due to a sudden load change becomes troublesome, and may cause commutation failure.

It has been found that the core of the output transformer in the circuit of the type which has been illustrated appears to heat up much more than that of an ordinary power transformer operating from 60-cycle power mains. This heating appears to be due to third harmonic currents flowing in the transformer windings. It is desirable, therefore, for proper operation of the power amplifier which has been described that its output transformer be designed sufficiently large to dissipate the heat generated.

While I have described what I at present consider the preferred embodiment of my invention, it will be obvious to those skilled in the art that the various improvements described therein over similar circuits of the prior art may be desirable in circuits other than power amplifying circuits, and that various changes and modifications may be made therein without departing from my invention. The invention is only to be limited by the scope of the appended claims.

What is claimed is:

1. In combination, an alternating current supply circuit, an alternating current load circuit subject to substantial load variations, and a coupling circuit therebetween comprising a pair of electric discharge devices each having a cathode, an anode and circuits therefor, the cathode-anode circuits of said devices including in common a source of direct current for polarizing said anodes and inductance in series, means for impressing alternating current from said supply circuit on the grids of said devices in such manner as to make the devices alternately conductive and non-conductive, commutating capacitance connected between the two anodes, means coupling the cathode-anode circuits of said devices symmetrically to said load circuit, and means for reducing variations in the voltages transmitted to said load circuit, due to the transient conditions in the circuits of said devices, including a resistance of suitable value connected in shunt with said inductance.

2. In combination, an alternating current supply circuit, an alternating current load circuit subject to substantial load variations, and a coupling circuit therebetween comprising a pair of electric discharge devices each having a cathode, an anode and a control grid and circuits therefor, the cathode-anode circuits of said devices being connected in parallel and including in common a source of direct current for polarizing said anodes and a choke coil in series, means for impressing alternating current from said supply circuit on the grids of said devices in such manner as to make the devices alternately conductive and non-conductive, a commutating capacitor connected between the anodes of said devices, means for coupling the cathode-anode circuits of said devices symmetrically to said load circuit, and means for reducing variations in the voltages transmitted to said load circuit, due to transient conditions in the circuits of said devices, including a resistive element connected in shunt with said choke coil.

3. In combination, an alternating current supply circuit, an alternating current load circuit subject to substantial load variations, and a circuit for transmitting energy therebetween comprising a pair of electric discharge devices each having a cathode, an anode and a control grid, a common source of direct current for polarizing said anodes, means for impressing alternating current from said supply circuit on the grids of said devices in such manner as to make said devices alternately conductive and non-conductive, a commutating capacitor connected between the two anodes, an inductance connected between said common direct current polarizing source and the respective anodes of said devices, means for impressing the output voltage of said transmitting circuit on said load circuit, and means for reducing the effects of transient voltages set up in said transmitting circuit due to changes in the associated circuits comprising a resistive element of suitable value connected in shunt with said inductance.

4. The combination of claim 3 in which said electric discharge devices are of the gas-filled type and in which said resistive element is made of such value as to substantially damp out oscillations arising between said commutating capacitor and said inductance due to sudden changes in the load in said load circuit.

5. In combination, an alternating current supply circuit, an alternating current load circuit having a definite load power factor and subject to substantial load variations, and a power amplifier therebetween comprising a pair of gas-filled electric discharge devices each having a cathode, an anode and a control grid, and circuits therefor, the cathode-anode circuits of said devices being connected in parallel and including a common source of direct current for polarizing the two anodes, the grid-cathode circuits of the two devices being coupled symmetrically with said alternating current supply circuit so that said devices become alternately conductive and non-conductive in response to alternating current therefrom, a commutating capacitor connected between the anodes of said devices, an inductive device in the common portion of the cathode-anode circuits of said devices, an output transformer coupling the cathode-anode circuits of said devices symmetrically to said load circuit, and means for reducing changes in the output voltage of said amplifier with changes in load in said load circuit, comprising a suitable resistive element connected in shunt with said inductive device.

6. The combination of claim 5 and in which said resistive element is a non-linear resistance having a negative voltage-resistance coefficient.

7. In combination, a source of alternating current of constant frequency, an alternating current load circuit subject to substantial load variations, a coupling circuit therebetween for transmitting energy of said frequency to said load circuit comprising a pair of gas-filled electric discharge devices each having a cathode, an anode and a control grid, and circuits therefor, the two cathode-anode circuits being connected in push-pull relation with a portion in common including a source of direct-current polarizing voltage for the two anodes and a choke coil in series, means for exciting the grids of said devices with said constant alternating frequency current in such manner that said devices become alternately conductive and non-conductive, a commutating capacitor connected between said anodes, a damping resistance of small value connected in shunt with said choke coil, and an output transformer coupling the two cathode-anode circuits symmetrically to said load circuit.

CARL H. RUMPEL.